(12) United States Patent
Klein

(10) Patent No.: US 6,438,687 B2
(45) Date of Patent: *Aug. 20, 2002

(54) METHOD AND APPARATUS FOR IMPROVED STORAGE OF COMPUTER SYSTEM CONFIGURATION INFORMATION

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/932,068

(22) Filed: Aug. 17, 2001

Related U.S. Application Data

(63) Continuation of application No. 08/960,716, filed on Oct. 30, 1997, now Pat. No. 6,282,640.

(51) Int. Cl.⁷ ................................................. G06F 9/06

(52) U.S. Cl. ............................................. 713/1; 713/2

(58) Field of Search ............................... 713/1, 2, 100; 711/102, 103, 104, 105

(56) References Cited

U.S. PATENT DOCUMENTS

| | | | |
|---|---|---|---|
| 5,269,022 A | 12/1993 | Shinjo et al. ................ | 395/700 |
| 5,307,497 A | 4/1994 | Feigenbaum et al. ........ | 395/700 |
| 5,327,531 A | 7/1994 | Bealkowski et al. ......... | 395/164 |
| 5,371,876 A | 12/1994 | Ewertz et al. .............. | 395/651 |
| 5,388,267 A | 2/1995 | Chan et al. .................. | 395/700 |
| 5,410,699 A | 4/1995 | Bealkowski et al. ........ | 395/700 |
| 5,657,448 A | 8/1997 | Wadsworth et al. ..... | 395/200.5 |
| 5,664,194 A | 9/1997 | Paulsen ....................... | 395/712 |
| 5,822,581 A | 10/1998 | Christeson .................. | 395/651 |
| 5,938,764 A | 8/1999 | Klein ............................ | 713/1 |

OTHER PUBLICATIONS

Compaq Computer Corporation; Phoenix Technologies Ltd.; and Intel Corporation "Plug and Play BIOS Specification, Version 1.0A", pp. 1–56, May 5, 1994.

Intel Corporation; Microsoft Corporation "Plug and Play ISA Specification, Version 1.0a", pp. 1–66, May 5, 1994.

Shanley, Tom/Anderson, Don, Chap. VII, "The Power–Up Sequence," pp. 113–117; Chap. XV, "ROM Memory," pp. 315–332; Chap. XXI, "RTC and Configuration RAM," pp. 441–447, *ISA System Architecture*, 3rd Edition, Addison–Wesley Publishing Co., U.S., 1995.

*Primary Examiner*—Thomas Lee
*Assistant Examiner*—Thuan Du
(74) *Attorney, Agent, or Firm*—Dorsey & Whitney LLP

(57) ABSTRACT

A computer system and method is described for improved storage of computer system configuration information. A ROM module includes both a BIOS ROM portion and a configuration ROM portion. The configuration ROM includes a backup copy of the system configuration parameters stored in a battery-powered configuration CMOS RAM. If the configuration CMOS RAM fails to provide valid configuration data, the contents of the configuration ROM are used to configure the computer system. If the contents of the configuration ROM are also invalid, default configuration values are provided by the BIOS ROM. User modification of the default values may be effected through a setup utility program, and the configuration ROM then programmed accordingly.

76 Claims, 3 Drawing Sheets

METHOD AND APPARATUS FOR IMPROVED STORAGE OF COMPUTER SYSTEM CONFIGURATION INFORMATION

CROSS-REFERENCE TO RELATED APPLICATION

This application is a continuation of pending U.S. patent application Ser. No. 08/960,716, filed Oct. 30, 1997, now U.S. Pat. No. 6,282,640.

TECHNICAL FIELD

This invention relates generally to computer systems, and more particularly, to storage of system configuration information used in computer systems.

BACKGROUND OF THE INVENTION

The use of computers, especially personal computers (PCs), is widespread. The computing power of the PC, whether coupled to a network or operating as a stand-alone device, has increased significantly as new computer designs move into production. Central processing units have become faster and more complex with each new generation of PC. Memory chips have increased in both capacity and speed. A wide variety of input/output (I/O) devices with various performance capabilities may be included in a PC. Examples of I/O devices include keyboards, pointing devices, scanners, disk drives, CD-ROM drives, printers, display monitors, local area network (LAN) adapters, FAX/modem boards, sound boards, etc. I/O devices are produced by many different manufacturers and come in various models with varying operational characteristics. The number of distinct combinations of components in a PC is very large.

In order for the components of a PC to function together properly and optimally, computer system configuration information is provided to a microprocessor during the power-on self-test (POST) and system initialization routines executed when a PC is first powered-up or reset. The system configuration information is used by the microprocessor to initialize the various components of the PC. Device registers are set, device parameters are loaded, interrupt vectors are created, etc. Computer operating system and/or other system management software is then configured in accordance with the system configuration information.

Because of the wide variety of system components available in today's PCs, a battery-powered complementary metal oxide semiconductor (CMOS) random access memory (RAM) is included to retain the computer system configuration information when the PC is powered-down. Typically, the CMOS RAM is part of the computer system's real-time clock and calendar chip. In the event the system configuration information stored in the CMOS RAM is lost, certain configuration default values are provided by the read-only memory (ROM) basic input/output service (BIOS) chip. However, unlike configuration information stored in the CMOS RAM, these default values are not customized to the particular configuration of the PC. The PC then functions poorly, and a user must reprogram the configuration CMOS RAM. Properly reprogramming the CMOS RAM with the lost system configuration parameters can be difficult, especially for individuals with little or no technical background.

Manufacturers have attempted to overcome the problems associated with lost computer system configuration information by providing highly reliable batteries to power the volatile CMOS RAM. Additionally, certain components, such as peripheral add-ins with plug-and-play capability, include a non-volatile ROM memory for storing that particular component's configuration parameters. However, it can be appreciated that there is a significant need for an improved method and apparatus for storage of computer system configuration information.

SUMMARY OF THE INVENTION

The present invention is embodied in a method and apparatus for improved storage of computer system configuration information. A computer system includes a ROM module having a BIOS ROM portion and a configuration ROM portion. The system also includes a battery-powered configuration CMOS RAM for storing system configuration parameters required to initialize various computer system components. The configuration ROM includes a backup copy of the system configuration parameters. If the configuration CMOS RAM fails to provide valid configuration data, the contents of the configuration ROM are then used to configure and initialize the computer system. Basic system default configuration values are provided by the BIOS ROM only in the event the contents of the configuration ROM are also invalid. A user may then modify the system configuration default values and reprogram the configuration ROM accordingly.

In one embodiment, a computer system includes a first non-volatile memory for storing system start-up routines executable by a microprocessor. A second non-volatile memory stores system configuration parameters, each corresponding with one of a plurality of selected system components. The first and second non-volatile memories may be first and second reserved portions of a single non-volatile memory. The microprocessor executes the system start-up routines to initialize each of the system components according to the system configuration parameters.

In a second embodiment, a computer system includes a microprocessor, a plurality of I/O devices coupled with the microprocessor, and a configuration data storage system. The configuration data storage system includes a volatile memory for storing a plurality of custom configuration data, which the microprocessor uses to initialize each of the I/O devices. The configuration data storage system also includes first and second non-volatile memories. The first non-volatile memory stores a back-up copy of the custom configuration data, and the microprocessor copies this back-up copy into the volatile memory in the event the data stored in the volatile memory is corrupted. The second non-volatile memory stores default configuration data, and the microprocessor initializes each of the I/O devices according to the default configuration data in the event that both the data stored in the volatile memory and in the first non-volatile memory are corrupted.

A method of operating a computer system includes programming a first non-volatile memory with a set of system initialization routines executable by a microprocessor. The first non-volatile memory is also programmed with a set of basic system configuration default parameters. A second non-volatile memory is programmed with a plurality of customized computer configuration parameters corresponding with selected computer system components. The customized computer configuration parameters are tested for errors. If an error is indicated, the system initialization routines are executed to initialize each of the selected computer system components in accordance with the default parameters. If, however, no error is indicated, the system initialization routines are executed to initialize each of the computer system components in accordance with the customized computer configuration parameters.

A method is provided for configuring a computer system which includes a processor coupled with a non-volatile memory, a volatile memory, and a plurality of I/O devices. Both default system configuration data and customized system configuration data are stored in the non-volatile memory. The customized system configuration data is also stored in the volatile memory. A first validity status is checked for the customized system configuration data stored in the volatile memory. If this first status is valid, each of the I/O devices is initialized in accordance with the data stored in the volatile memory. If the first status is invalid, a second validity status is checked for the customized system configuration data stored in the non-volatile memory. If this second status is valid, the customized system configuration data stored in the non-volatile memory is copied into the volatile memory.

DETAILED DESCRIPTION OF THE INVENTION

Embodiments of a novel computer system and a method are described for improved storage of computer system configuration information. In the following description, specific details are set forth in order to provide a sufficient understanding of the present invention. It will be clear, however, to one skilled in the art that the present invention may be practiced without these details. In other instances, well-known circuits, control signals and software operations have not been shown in detail in order not to unnecessarily obscure the invention.

Figure 1:
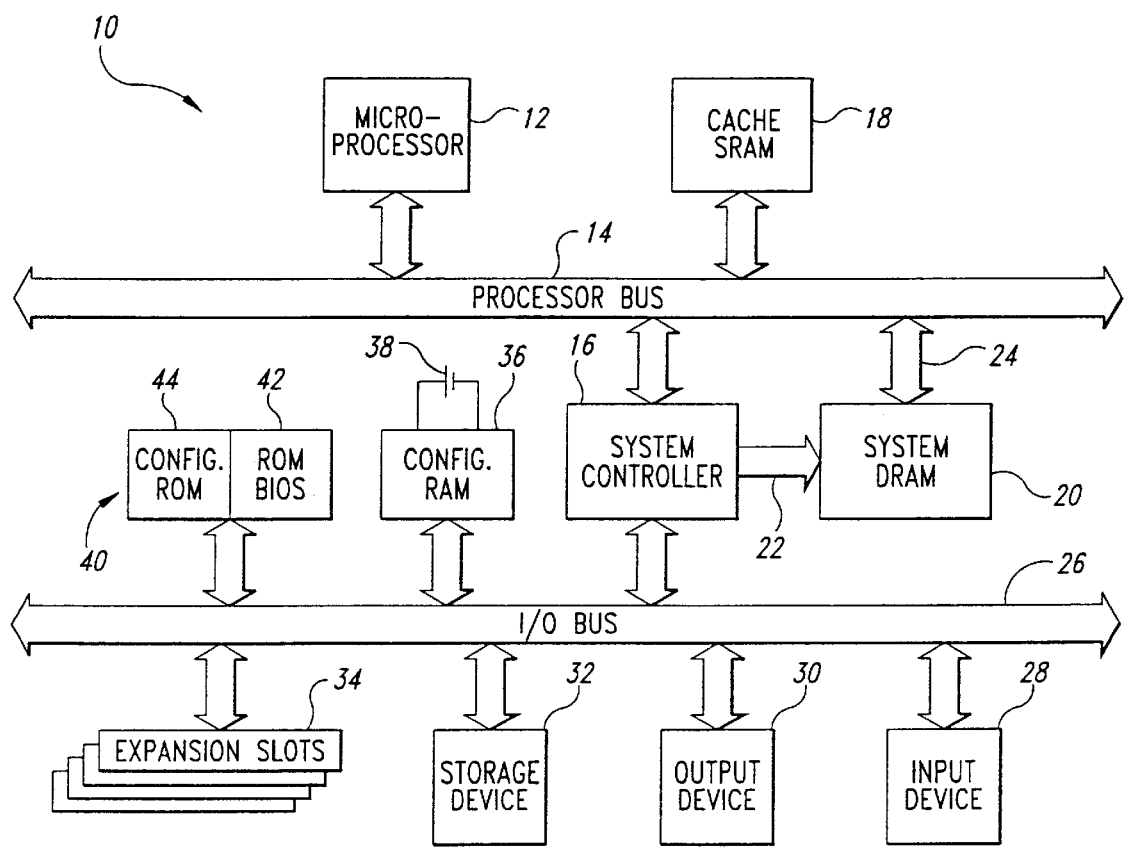
FIG. 1 is a functional block diagram of a preferred embodiment of a computer system having a configuration ROM according to the present invention.

FIG. 1 shows a computer system 10, such as an IBM-compatible PC, according to the present invention. A microprocessor 12, such as the Pentium™ processor, is connected to a processor bus 14 which carries address, data and control signals. The processor bus 14 is in turn connected to a system controller 16 and a cache memory 18, such as a static random access memory (SRAM) array. The system controller 16 acts as a memory controller accessing a main memory, such as a system dynamic random access memory (DRAM) 20, via a memory address and control bus 22. A data portion of the processor bus 14 is coupled with the system DRAM 20 by a memory data bus 24. The system DRAM 20 can include any of various known memory devices, such as DRAM devices manufactured by Micron Technology, Inc.

The system controller 16 also serves as a bridge circuit between the processor bus 14 and a system bus, such as I/O bus 26. The I/O bus 26 may itself be a combination of one or more bus systems with associated interface circuitry (e.g., PCI bus with connected SCSI and ISA bus systems). Connected to the I/O bus 26 are multiple I/O devices 28–32. One or more data input devices 28, such as a keyboard, mouse, etc., are coupled to the I/O bus 26. Also, one or more data output devices 30, such as visual display devices, printers, etc., are coupled to the I/O bus 26. Additionally, one or more data storage devices 32, such as disk drives, tape drives, CD-ROM drives, etc., are coupled to the I/O bus 26. Also coupled to the I/O bus 26 are expansion slots 34 to provide future accommodation of other I/O devices not selected during the original design of the computer system.

As in prior art computer systems, the computer system 10 includes a volatile configuration CMOS RAM 36 which is powered by a battery 38. The configuration CMOS RAM 36 is programmed in a conventional manner to store those computer system configuration parameters customized to the particular components employed in the computer system 10. These customized system configuration parameters are required to initialize the computer system 10 for proper and optimal operation. Unlike prior art PCs, the computer system 10 includes a non-volatile ROM module 40 having a BIOS ROM portion 42 and a configuration ROM portion 44. The ROM module 40 is preferably a flash electrically erasable programmable read-only memory (flash EEPROM). The BIOS ROM portion 42 and the configuration ROM portion 44 are preferably included in a single ROM chip; however, separate BIOS ROM and configuration ROM chips are acceptable.

The BIOS ROM 42 is programmed in a conventional manner to include various well-known instruction sets controlling the operation of the microprocessor 12. Included are system start-up routines, such as POST, system configuration initialization, arid disk boot (in which a computer operating system program is located and instructions therefrom executed by the microprocessor 12). The BIOS ROM 42 also includes hardware interrupt handling and program service request handling routines. The program service request handling routines attend to the details of interacting with I/O devices and service those requests initiated by software programs to, for example, read information from a hard drive, clear a display screen, or write information to a printer. The hardware interrupt handling routines handle requests initiated by hardware components of the computer system, such as when a key is pressed on a keyboard.

Under control of the system initialization routines provided by the BIOS ROM 42, the microprocessor 12 initializes various system components by checking for system configuration information stored in the battery-powered configuration CMOS RAM 36 and by electronically interrogating certain of the system components and checking for a response. Also stored in the BIOS ROM 42 is a novel start-up routine which the processor executes in the event the configuration CMOS RAM 36 has failed to properly store the system configuration parameters. This new start-up routine is described in detail below in connection with FIGS. 2A and 2B.

The configuration ROM 44 is programmed to store a copy of the system configuration parameters contained in the configuration CMOS RAM 36. In the event the configuration CMOS RAM 36 fails, the necessary system configuration information may be retrieved from the configuration ROM 44. A system management utility program then allows copying the contents of the configuration ROM 44 to the configuration CMOS RAM 36, once the conditions causing the failure of the configuration CMOS RAM have been corrected. System management utility programs for reading data in one location and writing that data to another location in a computer system are well known to those skilled in the art and need not be described in detail. Even if the failure of the configuration CMOS RAM 36 has not been corrected, system configuration parameters can be obtained directly from the configuration ROM 44 by rerouting data access operations from the configuration CMOS RAM to the configuration ROM. Such data access operation rerouting can be accomplished by well-known means and need not be described in detail. In effect, the prior art provision of certain basic system configuration default values has been replaced by a back-up copy of the customized system configuration values.

For purposes of compatibility with present day computer systems, the battery-powered configuration CMOS RAM 36 is included in the preferred embodiment of the present invention. However, those skilled in the art will appreciate that the configuration CMOS RAM 36 may be eliminated and replaced entirely by the configuration ROM 44. Maintaining real-time clock and calendar functionality is then provided either by continued use of a battery or by relying on the presence of AC power to maintain the clock under normal circumstances. A capacitor could power the real-time clock during those most typical power outages that are of short duration. Alternatively, real-time clock and calendar functions can be provided by computer network servers and need not be included in individual PCs.

Figure 2A:
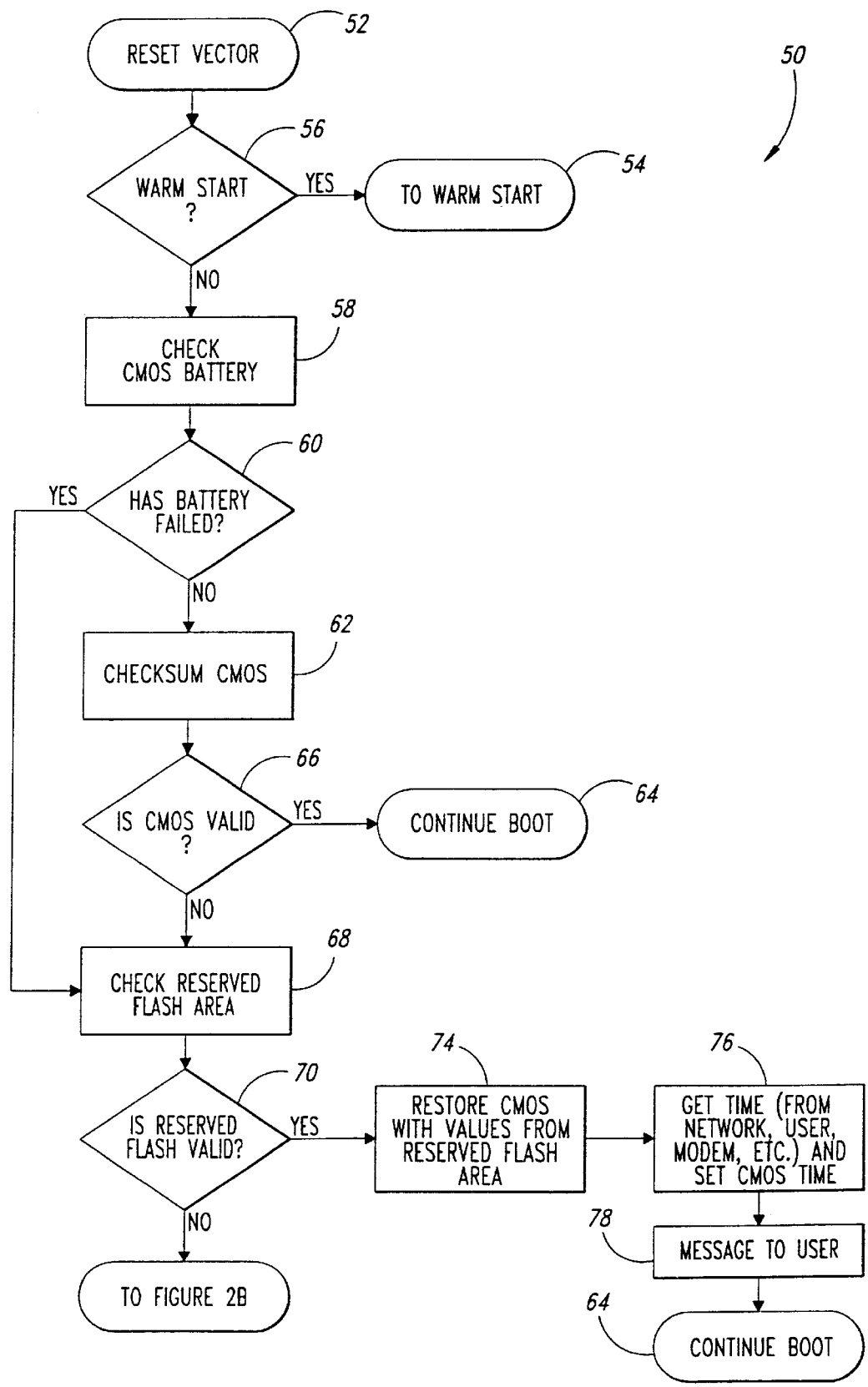
FIGS. 2A and 2B are flowcharts depicting a method of operating the computer system of FIG. 1.
Figure 2B:
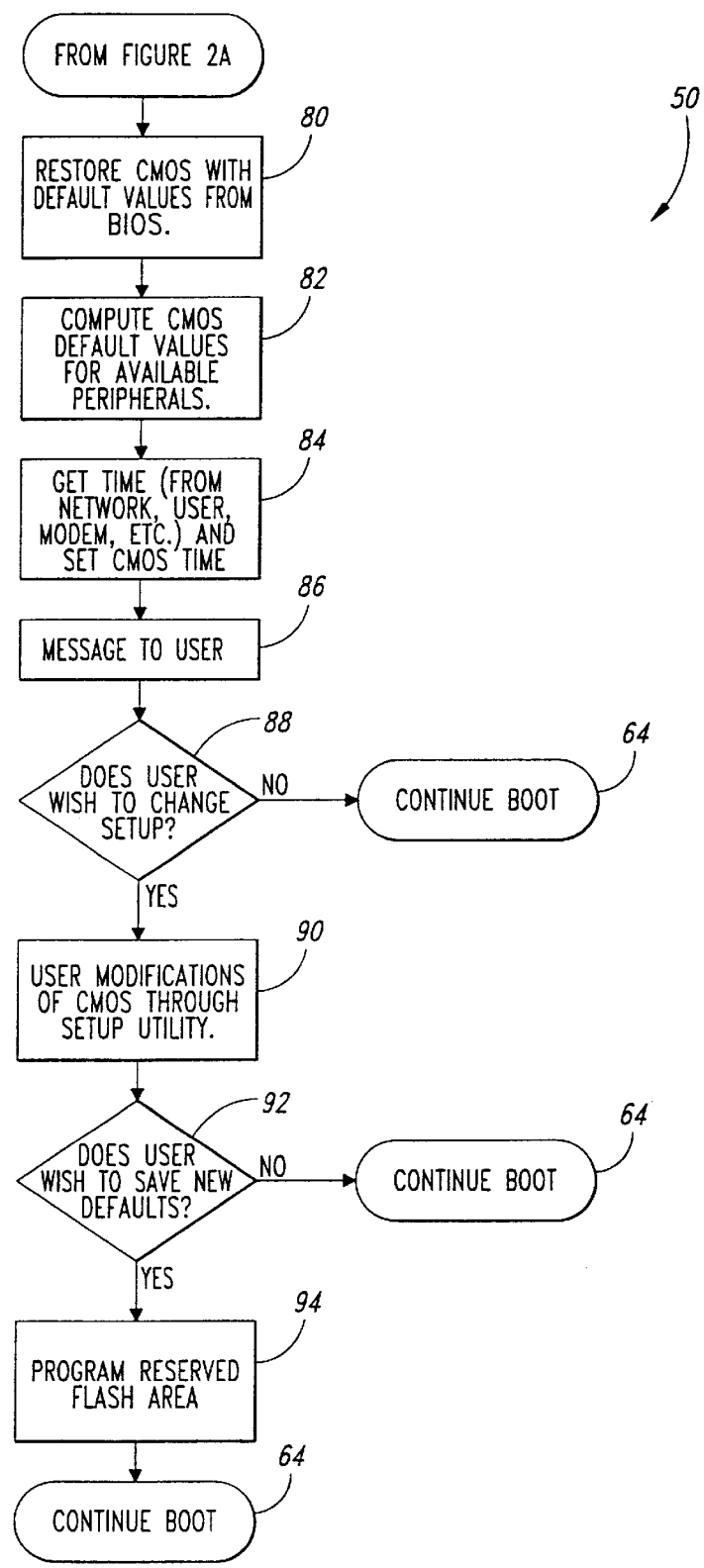

FIGS. 2A and 2B depict a computer system start-up software routine 50 executed by the microprocessor 12 and stored in the BIOS ROM 42 of the computer system 10 shown in FIG. 1. Upon receipt of a reset vector in a step 52, the microprocessor 12 begins execution of the start-up routine 50. In the event the reset vector is associated with a warm start (in which case POST and system initialization routines are skipped), the microprocessor 12 is routed to a conventional set of warm start instructions 54 via a conditional branch step 56. If a warm start is not indicated, a CMOS RAM status bit is checked in a step 58. The CMOS RAM status bit is well known to those skilled in the art, and when set to zero indicates that the battery has failed or been disconnected. A conditional branch step 60 then routes the program sequence dependent upon the results of the step 58. In the event the battery has not failed, the data validity of the configuration CMOS RAM 36 is tested in a step 62, typically by performing a checksum operation. If the CMOS RAM contents are valid, the microprocessor 12 is directed to a sequence of conventional operations 64 by a conditional branch step 66. The sequence of operations 64 continues system boot in a conventional manner.

If either the battery has failed or the results of the checksum operation indicate invalid data, the microprocessor 12 then executes a step 68 in which the data content of the con-figuration ROM 44 is tested. Preferably, this test would also employ a checksum operation, as in the step 62, although any of a variety of well-known error testing operations is acceptable. If the contents of the configuration ROM 44 are valid, a conditional branch step 70 directs the microprocessor 12 to a step 74 in which the contents of the configuration ROM 44 are written to the configuration CMOS RAM 36. Time and date information must then be obtained from a user, a network, modem, etc., in a step 76. A status message may be displayed to the user in a step 78, and the sequence of operations 64 associated with continued system boot is then executed in a conventional manner.

If, however, the contents of the configuration ROM 44 are not valid, the conditional branch in the step 70 directs the microprocessor 12 to a sequence of operations depicted in FIG. 2B. As in prior art computer systems, the microprocessor 12 must then rely on basic system configuration default values stored in the BIOS ROM 42, and the con-figuration CMOS RAM 36 is written with these default values in a step 80. If certain of the system components respond to auto-identification commands, additional configuration default values may be computed and stored in the configuration CMOS RAM 36 in a step 82. Time and calendar information is then obtained in a step 84 from the user, network, modem, etc., and a status message to the user may be displayed in a step 86.

The user may then choose to change certain of the default configuration values or to continue system boot with the BIOS default values via a conditional branch step 88. If the user wishes to continue system boot with the BIOS default values, the conditional branch step 88 directs the microprocessor 12 to the sequence of operations 64. If, however, the user wishes to modify certain of the default values prior to continued system boot, the user may effect such modification in a step 90 by using a conventional setup utility program. A conditional branch step 92 then allows the user to determine whether to program the configuration ROM 44 with the modified parameters contained in the configuration CMOS RAM 36. If so, the contents of the configuration CMOS RAM 36 are written to the configuration ROM 44 in a step 94, and the system boot is continued with the sequence of operations 64. If the user does not wish to program the configuration ROM 44, the conditional branch step 92 then directs the microprocessor 12 to the sequence of operations 64 continuing system boot.

As described above, the preferred embodiment of a computer system 10 according to the present invention includes a configuration CMOS RAM 36 for reasons of maintaining compatibility with present day computer systems and computer operating systems and/or other system management software routines. However, those skilled in the art will appreciate that the configuration CMOS RAM 36 can be eliminated and the computer system start-up routine 50 depicted in FIGS. 2A and 2B modified accordingly. In such a case, the steps 58–68 are eliminated and the conditional branch step 56 directs the microprocessor 12 to the step 70 if no warm start is indicated. Also, the steps 74–78 are eliminated and the conditional branch step 70 directs the microprocessor to the continued system boot operations 64 if the contents of the configuration ROM 44 are valid. The modification and saving of basic system configuration default values, shown in FIG. 2B, is also changed similarly.

Those skilled in the art will appreciate that many of the individual steps depicted in FIGS. 2A and 2B and described above are in fact each a sequence of operations which are well known in the art. One skilled in the art would be able to program such operations in the described sequence to practice the present invention. The various operations associated with each of the steps depicted in FIGS. 2A and 2B are not part of, nor critical to, the invention. Therefore, a detailed description of these operations is not required. Similarly, each of the circuits whose function and interconnection is described above in connection with FIG. 1 is of a type known in the art, and one skilled in the art would be able to use such circuits in the described combination to practice the present invention. The internal details of these particular circuits are not part of, nor critical to, the invention, and a detailed description of the internal circuit operation need not be provided.

It will be appreciated that, although an embodiment of the invention has been described above for purposes of illustration, numerous variations may be made without deviating from the spirit and scope of the invention. Those skilled in the art will appreciate that any number of well-known processor and bus types could be employed according to the present invention. Additionally, variations on the sequence of operations described in connection with FIGS. 2A and 2B is contemplated within the scope of the present invention. Accordingly, the invention is not limited except as by the appended claims.

What is claimed is:

1. An initialization memory for a system, the initialization memory comprising:

a primary memory section storing preferred initialization information;

a secondary memory section storing supplementary initialization information, at least one of the primary memory section and the secondary memory section being comprised of a user programmable nonvolatile memory; and operating logic structured to detect defects in the primary memory section and the secondary memory section, the operating logic being further structured to cause the system to be configured according to the preferred initialization information if the operating logic detects no defects in the primary memory section, and to cause the system to be configured from the secondary memory section according to the supplementary initialization information if the operating logic detects at least one defect in the primary memory section.

2. The initialization memory of claim 1 wherein the operating logic is structured to cause an error message to be communicated to the system user if the operating logic detects at least one defect in the primary memory section.

3. The initialization memory of claim 1 wherein the operating logic is structured to replace the preferred initialization information stored in the primary memory section with the supplementary initialization information stored in the secondary memory section if the operating logic detects at least one defect in the primary memory section.

4. The initialization memory of claim 1 wherein the operating logic is structured to cause an error message to be communicated to the system user and, upon receiving authorization from the system user, to replace the preferred initialization information stored in the primary memory section with the supplementary initialization information stored in the secondary memory section if the operating logic detects at least one defect in the primary memory section.

5. The initialization memory of claim 1 further comprising a tertiary memory section, the tertiary memory section being a nonvolatile memory that stores basic initialization information, and wherein the operating logic is further structured to cause the system to be configured according to the basic initialization information if the operating logic detects at least one defect in the primary memory section and at least one defect in the secondary memory section.

6. The initialization memory of claim 5 wherein the secondary memory section and the tertiary memory section reside in a single memory device.

7. The initialization memory of claim 5 wherein the secondary memory section and the tertiary memory section reside in separate memory devices.

8. The initialization memory of claim 1 wherein the primary memory section comprises a volatile memory device.

9. The initialization memory of claim 8 wherein the primary memory section also stores clock parameters.

10. The initialization memory of claim 8 wherein the primary memory section also stores date parameters.

11. The initialization memory of claim 8 further comprising a initialization memory power supply separate from a computer system power supply, the initialization memory power supply allowing the primary memory section to maintain information stored in the primary memory section when the computer system power supply is interrupted.

12. The initialization memory of claim 1 wherein both the primary memory section and the secondary memory section reside in a single memory device.

13. The initialization memory of claim 1 wherein the primary memory section and the secondary memory section reside in separate memory devices.

14. The initialization memory of claim 1 wherein contents of the nonvolatile memory may be changed by the operating logic without applying any external means.

15. The initialization memory of claim 14 wherein the nonvolatile memory comprises electrically erasable programmable read only memory devices.

16. The initialization memory of claim 15 wherein the nonvolatile memory comprises flash electrically erasable read only memory devices.

17. The initialization memory of claim 1 wherein the initialization information comprises configuration parameters.

18. The initialization memory of claim 1 wherein the initialization information comprises system start-up routines.

19. The initialization memory of claim 1 wherein the initialization information comprises both configuration parameters and system start-up routines.

20. A computer system comprising:

a processor;

a plurality of input devices operably connected to the processor to allow data to be entered into the computer system;

a plurality of output devices operably connected to the processor to allow data to be output from the computer system;

a system memory operably connected to the processor;

an initialization memory operably connected to the processor, the initialization memory comprising:
a primary memory section storing preferred initialization information;
a secondary memory section storing supplementary initialization information;
at least one of the primary memory section and the secondary memory section being comprised of a nonvolatile memory adaptable by a system user;
operating logic structured to detect defects in the primary memory section and the secondary memory section, the operating logic being further structured to cause the system to be configured according to the preferred initialization information if the operating logic detects no defects in the primary memory section, and to cause the system to be configured from the secondary memory section according to the supplementary initialization information if the operating logic detects at least one defect in the primary memory section.

21. The computer system of claim 20 wherein the operating logic is structured to cause an error message to be communicated to the system user if the operating logic detects at least one defect in the primary memory section.

22. The computer system of claim 20 wherein the operating logic is structured to replace the preferred initialization information stored in the primary memory section with the supplementary initialization information stored in the secondary memory section if the operating logic detects at least one defect in the primary memory section.

23. The computer system of claim 20 wherein the operating logic is structured to cause an error message to be communicated to the system user and, upon receiving authorization from the system user, to replace the preferred initialization information stored in the primary memory section with the supplementary initialization information stored in the secondary memory section if the operating logic detects at least one defect in the primary memory section.

24. The computer system of claim 20 further comprising a tertiary memory section, the tertiary memory section being a nonvolatile memory that stores basic initialization information, and wherein the operating logic is further structured to cause the system to be configured according to the basic initialization information if the operating logic detects at least one defect in the primary memory section and at least one defect in the secondary memory section.

25. The computer system of claim 24 wherein the secondary memory section and the tertiary memory section reside in a single memory device.

26. The computer system of claim 24 wherein the secondary memory section and the tertiary memory section reside in separate memory devices.

27. The computer system of claim 20 wherein the primary memory section comprises a volatile memory device.

28. The computer system of claim 27 wherein the primary memory section also stores clock parameters.

29. The computer system of claim 27 wherein the primary memory section also stores date parameters.

30. The computer system of claim 27 further comprising an initialization memory power supply separate from a computer system power supply, the initialization memory power supply allowing the primary memory section to maintain information stored in the primary memory section when the computer system power supply is interrupted.

31. The computer system of claim 20 wherein both the primary memory section and the secondary memory section reside in a single memory device.

32. The computer system of claim 20 wherein the primary memory section and the secondary memory section reside in separate memory devices.

33. The computer system of claim 20 wherein contents of the nonvolatile memory may be changed by the operating logic without applying any external means.

34. The computer system of claim 33 wherein the nonvolatile memory comprises electrically erasable programmable read only memory devices.

35. The computer system of claim 34 wherein the nonvolatile memory comprises flash electrically erasable read only memory devices.

36. The computer system of claim 20 wherein the initialization information comprises configuration parameters.

37. The computer system of claim 20 wherein the initialization information comprises system start-up routines.

38. The computer system of claim 20 wherein the initialization information comprises both configuration parameters and system start-up routines.

39. A method for initializing a computer system, the method comprising:

storing preferred initialization information in a primary memory section;

storing supplementary initialization information in a secondary memory section;

devising at least one of the primary memory section and the secondary memory section as a user programmable nonvolatile memory;

checking for defects in the primary memory section and in the secondary memory section;

selectively configuring the computer system according to the preferred initialization information if there are no defects in the primary memory section; and selectively configuring the computer system from the secondary memory section according to the supplementary initialization information if there is at least one defect in the primary memory section.

40. The method of claim 39 further comprising communicating an error message to the system user if there is at least one defect in the primary memory section.

41. The method of claim 39 further comprising replacing the preferred initialization information stored in the primary memory section with the supplementary initialization information stored in the secondary memory section if there is at least one defect in the primary memory section.

42. The method of claim 39 further comprising communicating an error message to the system user and, upon receiving authorization from the system user, replacing the preferred initialization information stored in the primary memory section with the supplementary initialization information stored in the secondary memory section if there is at least one defect in the primary memory section.

43. The method of claim 39 further comprising storing basic initialization information in a nonvolatile tertiary memory section and, upon detecting at least one defect in the primary memory section and at least one defect in the secondary memory section, configuring the computer system according to the basic initialization information.

44. The method of claim 43 further comprising containing the secondary memory section and the tertiary memory section in a single memory device.

45. The method of claim 43 further comprising containing the secondary memory section and the tertiary memory section in separate memory devices.

46. The method of claim 39 further comprising devising the primary memory section as a volatile memory device.

47. The method of claim 46 further comprising maintaining a time in the primary memory section.

48. The method of claim 46 further comprising maintaining a date in the primary memory section.

49. The method of claim 46 further comprising supplying alternative power to the primary memory section allowing the primary memory section to maintain information stored therein even when no power is supplied to the computer system.

50. The method of claim 39 further comprising containing the primary memory section and the secondary memory section in a single memory device.

51. The method of claim 39 further comprising containing the primary memory section and the secondary memory section in separate memory devices.

52. The method of claim 39 further comprising allowing the contents of the primary memory section and the secondary memory section to be changed without applying any external means.

53. The method of claim 52 further comprising devising the primary memory section and the secondary memory section from electrically erasable programmable read only memory devices.

54. The method of claim 53 further comprising devising the primary memory section and the secondary memory section from flash electrically erasable read only memory devices.

55. The method of claim 39 further comprising storing configuration parameters as the initialization information.

56. The method of claim 39 further comprising storing system start-up routines as the initialization information.

57. The method of claim 39 further comprising storing configuration parameters and system start-up routines as the initialization information.

58. A method for initializing a computer system, the method comprising:

maintaining redundant sets of initialization information in at least two memory sections, at least one of which comprises a nonvolatile memory adaptable by a system user;

checking the memory sections for defects;

selectively configuring the system according to a first set of initialization information stored in a first memory section if no defects are detected in the first memory section; and selectively configuring the system from the secondary memory section according to a second set of initialization information stored in a second memory section if there is at least one defect in the first memory section.

59. The method of claim 58 further comprising communicating an error message to the system user if at least one defect is detected in at least one of the memory sections.

60. The method of claim 58 further comprising replacing the set of initialization information stored in the memory section exhibiting the defect with the set of initialization information stored in another memory section if there is at least one defect in one of the memory sections.

61. The method of claim 58 further comprising communicating an error message to the system user and, upon receiving authorization from the system user, replacing the set of initialization information stored in the memory section exhibiting the defect with the set of initialization information stored in another memory section if there is at least one defect in one of the memory sections.

62. The method of claim 58 further comprising storing basic initialization information in a nonvolatile basic memory section and, upon detecting at least one defect in each of all other memory sections, configuring the computer system according to the basic initialization information.

63. The method of claim 62 further comprising containing at least one of the first memory section and the second memory section in a single memory device with the nonvolatile basic memory section.

64. The method of claim 62 further comprising containing the nonvolatile basic memory section in its own memory device.

65. The method of claim 58 further comprising devising one of the memory sections as a volatile memory device.

66. The method of claim 65 further comprising maintaining a time in the volatile memory device.

67. The method of claim 65 further comprising maintaining a date in the volatile memory device.

68. The method of claim 65 further comprising supplying alternative power to the volatile memory device allowing the volatile memory device to maintain information stored therein even when no power is supplied to the computer system.

69. The method of claim 58 further comprising containing the multiple memory sections in a single memory device.

70. The method of claim 58 further comprising containing the multiple memory sections in separate memory devices.

71. The method of claim 58 further comprising allowing the contents of the memory sections to be changed without applying any external means.

72. The method of claim 71 further comprising devising the memory sections from electrically erasable programmable read only memory devices.

73. The method of claim 72 further comprising devising the memory sections from flash electrically erasable read only memory devices.

74. The method of claim 58 further comprising storing configuration parameters as the initialization information.

75. The method of claim 58 further comprising storing system start-up routines as the initialization information.

76. The method of claim 58 further comprising storing configuration parameters and system start-up routines as the initialization information.

* * * * *